United States Patent
Seo et al.

(10) Patent No.: US 10,050,758 B2
(45) Date of Patent: Aug. 14, 2018

(54) METHOD AND DEVICE FOR DETERMINING REFERENCE SIGNAL ANTENNA PORT FOR DOWNLINK CONTROL CHANNEL IN WIRELESS COMMUNICATION SYSTEM

(71) Applicant: LG ELECTRONICS INC., Seoul (KR)

(72) Inventors: Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 14/372,997

(22) PCT Filed: Jan. 31, 2013

(86) PCT No.: PCT/KR2013/000795
§ 371 (c)(1),
(2) Date: Jul. 17, 2014

(87) PCT Pub. No.: WO2013/115580
PCT Pub. Date: Aug. 8, 2013

(65) Prior Publication Data
US 2014/0348126 A1     Nov. 27, 2014

Related U.S. Application Data

(60) Provisional application No. 61/593,259, filed on Jan. 31, 2012, provisional application No. 61/598,313, (Continued)

(30) Foreign Application Priority Data

Jan. 29, 2013 (KR) .................. 10-2013-0009815

(51) Int. Cl.
*H04L 5/00* (2006.01)
*H04W 72/04* (2009.01)
*H04B 17/10* (2015.01)

(52) U.S. Cl.
CPC ......... *H04L 5/0051* (2013.01); *H04B 17/102* (2015.01); *H04L 5/0005* (2013.01);
(Continued)

(58) Field of Classification Search
None
See application file for complete search history.

(56) References Cited

U.S. PATENT DOCUMENTS

2011/0286436 A1   11/2011   Suzuki et al.
2013/0083769 A1*   4/2013   Qu ................... H04L 5/0016
                                                                                370/330
(Continued)

FOREIGN PATENT DOCUMENTS

JP    2013-123204    6/2013
JP    2013-197877    9/2013
(Continued)

OTHER PUBLICATIONS

Alcatel-Lucent, et al., "PDCCH Enahncement in Rel-11," 3GPP TSG RAN WG1 Meeting #66, R1-112421, Aug. 2011, 6 pages.
Samsung, "Resource multiplexing of E-PDCCH," 3GPP TSG RAN WG1 #67, R1-114241, Nov. 2011, 3 pages.
Email discussion Rapporteur (Panasonic), "[60-10-LTE-A]: Email discussion on backhaul design for Type 1 relays," 3GPP TSG RAN WG1 Meeting #60bis, R1-102538, Apr. 2010, 11 pages.
(Continued)

*Primary Examiner* — Ayaz Sheikh
*Assistant Examiner* — Sori Aga
(74) *Attorney, Agent, or Firm* — Lee Hong Degerman Kang Waimey

(57) ABSTRACT

The present invention relates to a method of transmitting a downlink control channel including one or more control channel elements to a terminal by a base station in a wireless communication system. In particular, the method includes: allocating an antenna port of a demodulation-reference
(Continued)

signal (DM-RS) to the one or more control channel elements that configure the downlink control channel; and transmitting the downlink control channel to the terminal by using the DM-RS of the allocated antenna port, wherein the antenna port of the DM-RS is determined on the basis of the number of control channel elements per resource block.

9 Claims, 13 Drawing Sheets

Related U.S. Application Data filed on Feb. 13, 2012, provisional application No. 61/657,037, filed on Jun. 8, 2012, provisional application No. 61/722,224, filed on Nov. 4, 2012.

(52) U.S. Cl.
CPC ......... *H04L 5/0053* (2013.01); *H04W 72/042* (2013.01); *H04L 5/0023* (2013.01)

(56) References Cited

U.S. PATENT DOCUMENTS

| | | | | |
|---|---|---|---|---|
| 2013/0121304 A1* | 5/2013 | Nory | ..................... | H04L 1/1861 370/330 |
| 2013/0188577 A1* | 7/2013 | Papasakellariou | .... | H04W 72/04 370/329 |
| 2014/0050159 A1* | 2/2014 | Frenne | ................ | H04W 72/042 370/329 |

FOREIGN PATENT DOCUMENTS

| | | |
|---|---|---|
| WO | 2010/084901 | 7/2010 |
| WO | 2011/128013 | 10/2011 |
| WO | 2011/136523 | 11/2011 |
| WO | 2011/160280 | 12/2011 |
| WO | 2013/140732 | 9/2013 |

OTHER PUBLICATIONS

Research in Motion, UK Limited, "E-PDCCH Transmission with DMRS as Demodulation RS," 3GPP TSG RAN WG1 Meeting #67, R1-113958, Nov. 2011, 4 pages.

NTT DOCOMO, "DM-RS Design for E-PDCCH in Rel-11," 3GPP TSG RAN WG1 Meeting #67, R1-114302, Nov. 2011, 3 pages.

NTT DOCOMO, "Mapping Design for E-PDCCH in Rel-11," 3GPP TSG RAN WG1 Meeting #67, R1-114081, Nov. 2011, 5 pages.

Renesas Mobile Europe Ltd., "Link-level evaluation of E-PDCCH design aspects," 3GPP TSG-RAN WG1 Meeting #66, R1-112317, Aug. 2011, 9 pages.

NEC Group, "Performance aspects of DL control channel enhancements for Rel-11," 3GPP TSG RAN WG1 Meeting #66, R1-112136, Aug. 2011, 3 pages.

Alcatel-Lucent, et al., "Design details for enhanced PDCCH," 3GPP TSG RAN WG1 Meeting #66bis, R1-113322, Oct. 2011, 5 pages.

PCT International Application No. PCT/KR2013/000795, Written Opinion of the International Searching Authority dated May 15, 2013, 1 page.

The State Intellectual Property Office of the People's Republic of China Application Serial No. 201380007472.3, Office Action dated Aug. 29, 2016, 20 pages.

Panasonic, "Mapping of physical resources to R-PDCCH," 3GPP TSG RAN WG1 Meeting #63, R1-106088, Nov. 2010, 6 pages.

Alcatel-Lucent, et al., "PDCCH Enahncement in Rel-11," 3GPP TSG RAN WG1 Meeting #66, R1-122421, Aug. 2011, 6 pages.

Panasonic, "R-PDCCH placement," 3GPP TSG RAN WG1 Meeting #60bis, R1-102042, Apr. 2010, 6 pages.

3rd Generation Partnership Project (3GPP), "Technical Specification Group Radio Access Network; Evolved Universal Terrestrial Radio Access (E-UTRA); Physical Layer Procedures (Release 10)," 3GPP TS 36.213 V10.4.0, XP050561746, Dec. 2011, 126 pages.

European Patent Office Application Serial No. 13743879.2, Search Report dated Aug. 24, 2015, 8 pages.

* cited by examiner

FIG. 2
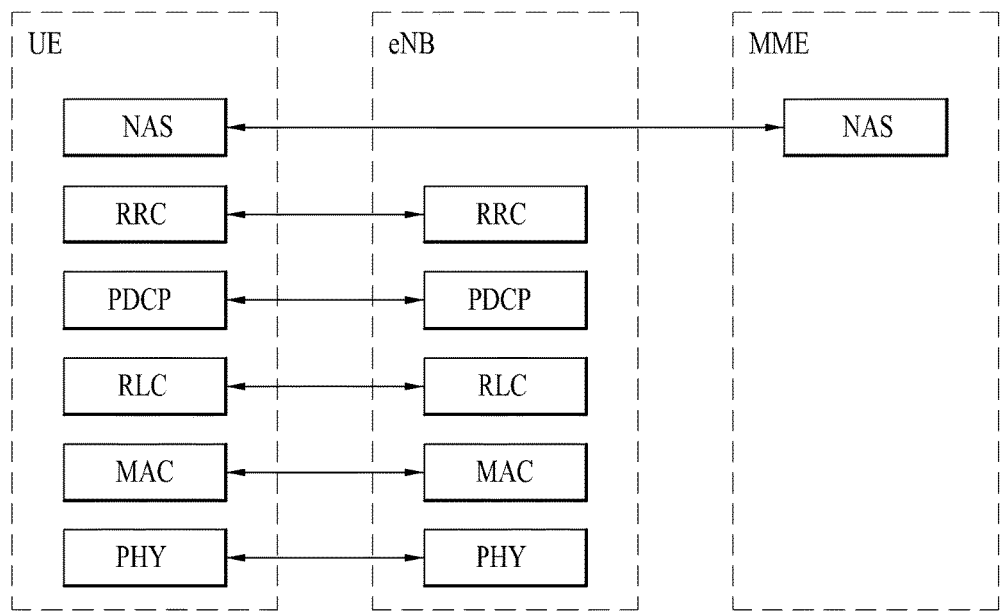
(a) contol - plane protocol stack
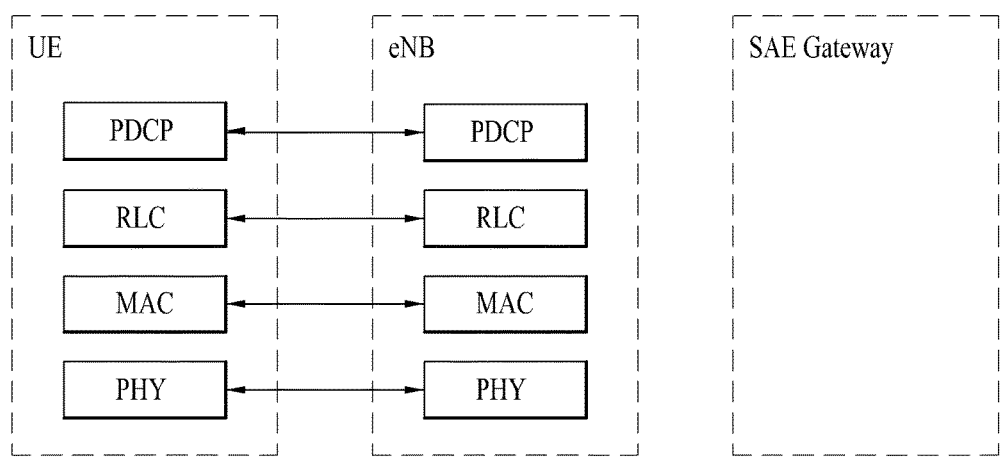
(b) user - plane protocol stack

FIG. 6
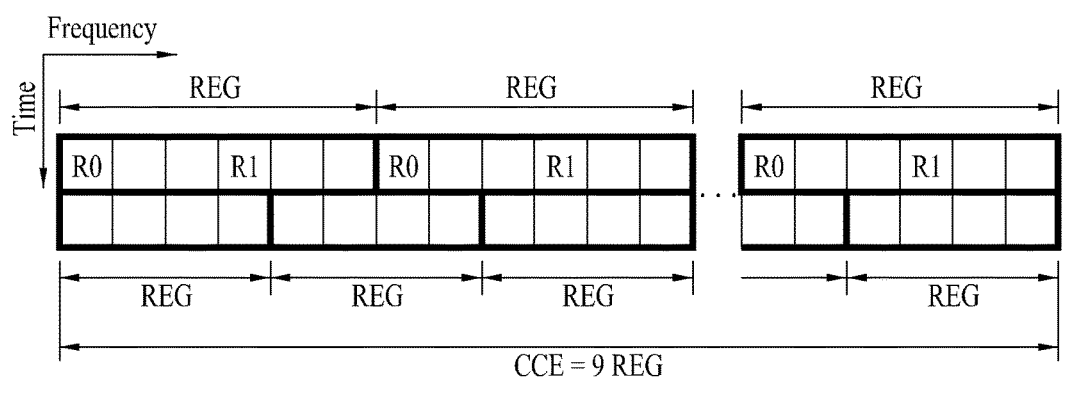
(a) 1TX or 2TX
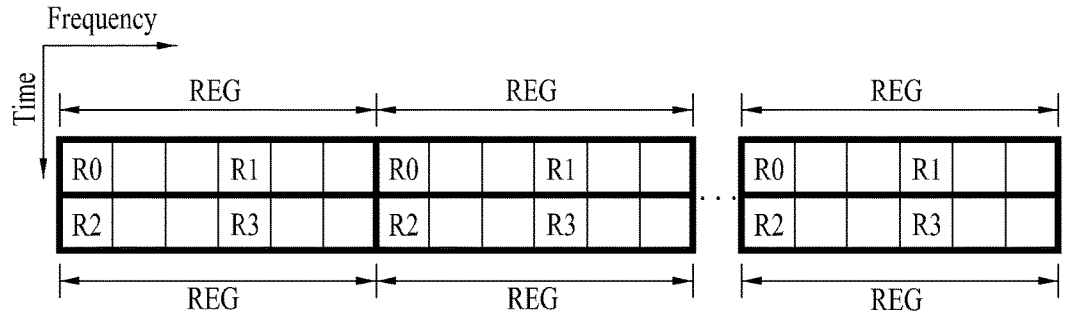
(b) 4 TX

☒ : DMRS group 1

☒ : DMRS group 2

METHOD AND DEVICE FOR DETERMINING REFERENCE SIGNAL ANTENNA PORT FOR DOWNLINK CONTROL CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2013/000795, filed on Jan. 31, 2013, which claims the benefit of earlier filing date and right of priority to Korean Application No. 10-2013-0009815, filed on Jan. 29, 2013, and also claims the benefit of U.S. Provisional Application Ser. Nos. 61/593,259, filed on Jan. 31, 2012, 61/598,313, filed on Feb. 13, 2012, 61/657,037, filed on Jun. 8, 2012 and 61/722,224, filed on Nov. 4, 2012, the contents of which are all hereby incorporated by reference herein in their entirety.

TECHNICAL FIELD

The present invention relates to a wireless communication system and, more particularly, to a method and device for determining a reference signal antenna port for a downlink control channel in a wireless communication system.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.44, 3, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and device for determining a reference signal antenna port for a downlink control channel in a wireless communication system.

Technical Solution

The object of the present invention can be achieved by providing a method for transmitting a downlink control channel comprised of at least one control channel element to a user equipment (UE) at a base station in a wireless communication system including allocating an antenna port for a demodulation reference signal (DM-RS) to the at least one control channel element and transmitting the downlink control channel to the UE using the DM-RS of the antenna port, wherein the antenna port is determined based on a number of control channel elements per resource block. The number of control channel elements per resource block may be changed according to a configuration of a subframe on which the downlink control channel is transmitted. The number of control channel elements per resource block may be 2 or 4.

If the number of control channel elements per resource block is 2, the antenna port may be one of antenna ports which are not multiplexed to the same resource elements. Alternatively, if the number of control channel elements per resource block is 2, an index of the antenna port may be one of 7 or 9.

If the number of control channel elements per resource block is 4, an index of the antenna port may be one of 7 to 10. The antenna port index 7 and the antenna port index 8 may be multiplexed to the same resource elements and the antenna port index 9 and the antenna port index 10 may be multiplexed to the same resource elements.

If a plurality of control channel elements is present, the control channel elements may belong to different resource blocks. The control channel elements may be allocated the same antenna ports.

According to another aspect of the present invention, there is a provided a method for receiving a downlink control channel from a base station at a user equipment (UE) in a wireless communication system including receiving the downlink control channel from the base station and demodulating the downlink control channel using a demodulation reference signal (DM-RS) of a predetermined antenna port, wherein the antenna port is determined based on a number of control channel elements per resource block.

If the number of control channel elements per resource block is 2, the antenna port may be one of antenna ports which are not multiplexed to the same resource elements. Alternatively, if the number of control channel elements per resource block is 2, an index of the antenna port may be one of 7 or 9.

If a plurality of control channel elements is present, the control channel elements may belong to different resource blocks. The control channel elements may be allocated the same antenna ports.

Advantageous Effects

According to the embodiments of the present invention, it is possible to efficiently determine an antenna port of a reference signal (RS) for a downlink control channel and, more particularly, a demodulation (DM)-RS.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

FIG. 6 is a diagram showing a resource unit used to configure a downlink control channel in an LTE system.

BEST MODE

Figure 1:
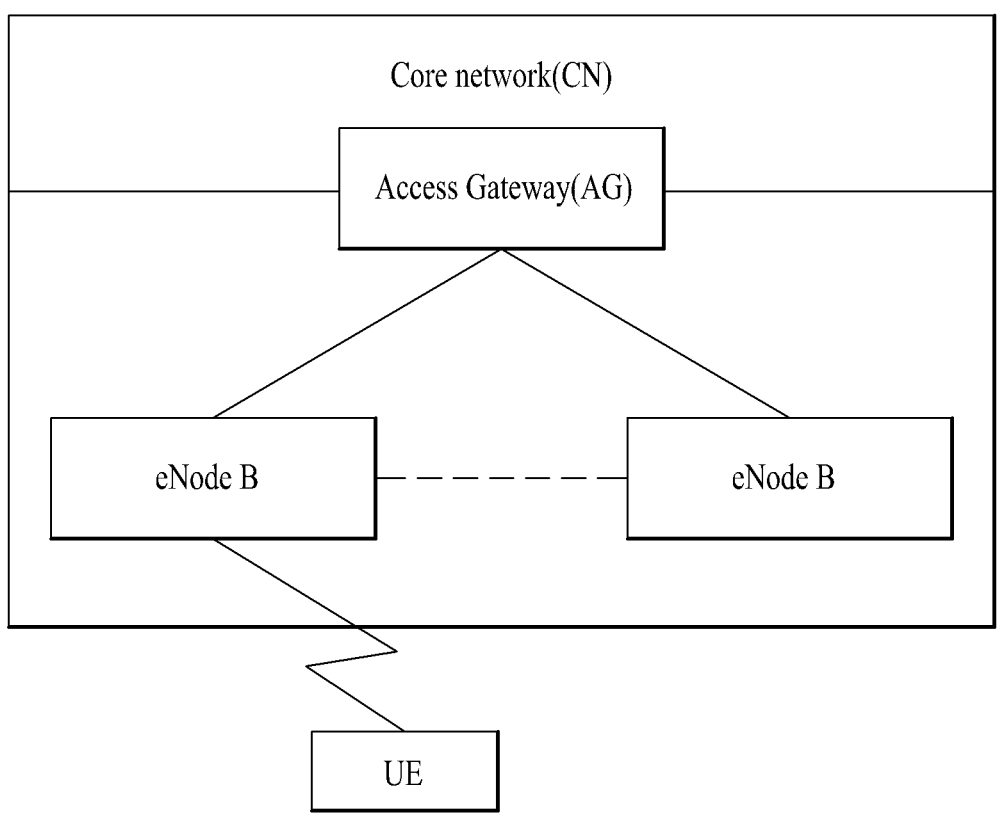
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
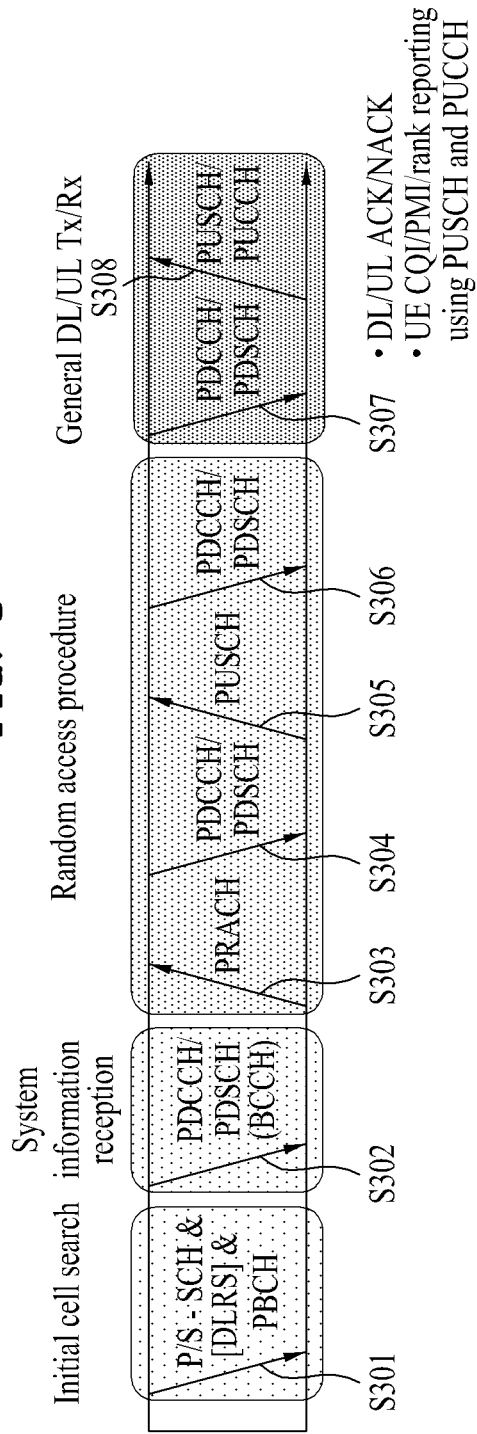
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 4:
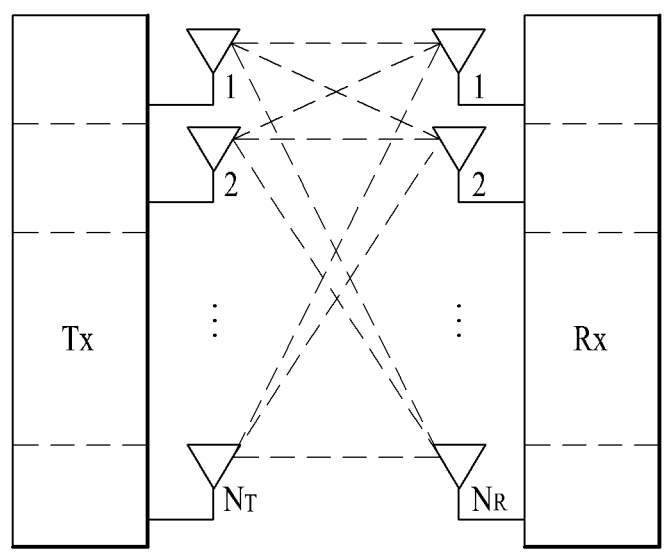
FIG. 4 is a diagram showing the configuration of a multi antenna communication system.

The configuration of the general multi-antenna (MIMO) communication system is shown in FIG. 4. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1. Here, $R_i$ is the smaller of the two values $N_T$ and $N_R$.

$$R_i = \min(N_T, N_R) \qquad \text{Equation 1}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

Figure 7:
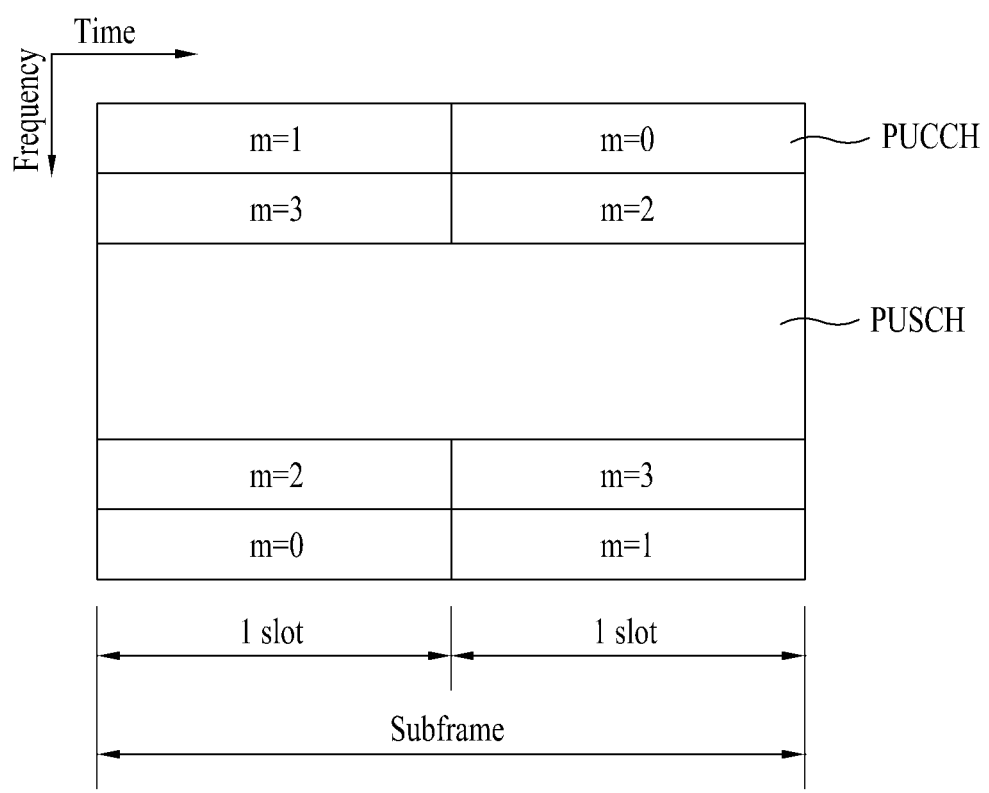
FIG. 7 is a diagram showing the structure of an uplink subframe used in an LTE system.

The communication method of the MIMO system will be described in more detail using mathematical modeling. As shown in FIG. 7, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2.

$$s = [s_1, s_2, \ldots, s_{NT}]^T \quad \text{Equation 2}$$

The transmitted information $s_1, s^2, \ldots, s_{N_T}$ may have different transmit powers. If the respective transmit powers are $P_1, P_2, \ldots, P_{N_T}$, the transmitted information with adjusted powers may be expressed by a vector shown in Equation 3.

$$\hat{s} = [\hat{s}_1, \hat{s}_2, \ldots, \hat{s}_{NT}]^T = [P_1 s_1, P_2 s_2, \ldots, P_{NT} s_{NT}]^T \quad \text{Equation 3}$$

In addition, $\hat{S}$ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{Equation 5}$$

$$= W\hat{s}$$
$$= WPs$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \quad \text{Equation 6}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7.

$$\text{\# of streams} \leq \text{rank}(H) \leq \min(N_T, N_R) \quad \text{Equation 7}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

Figure 5:
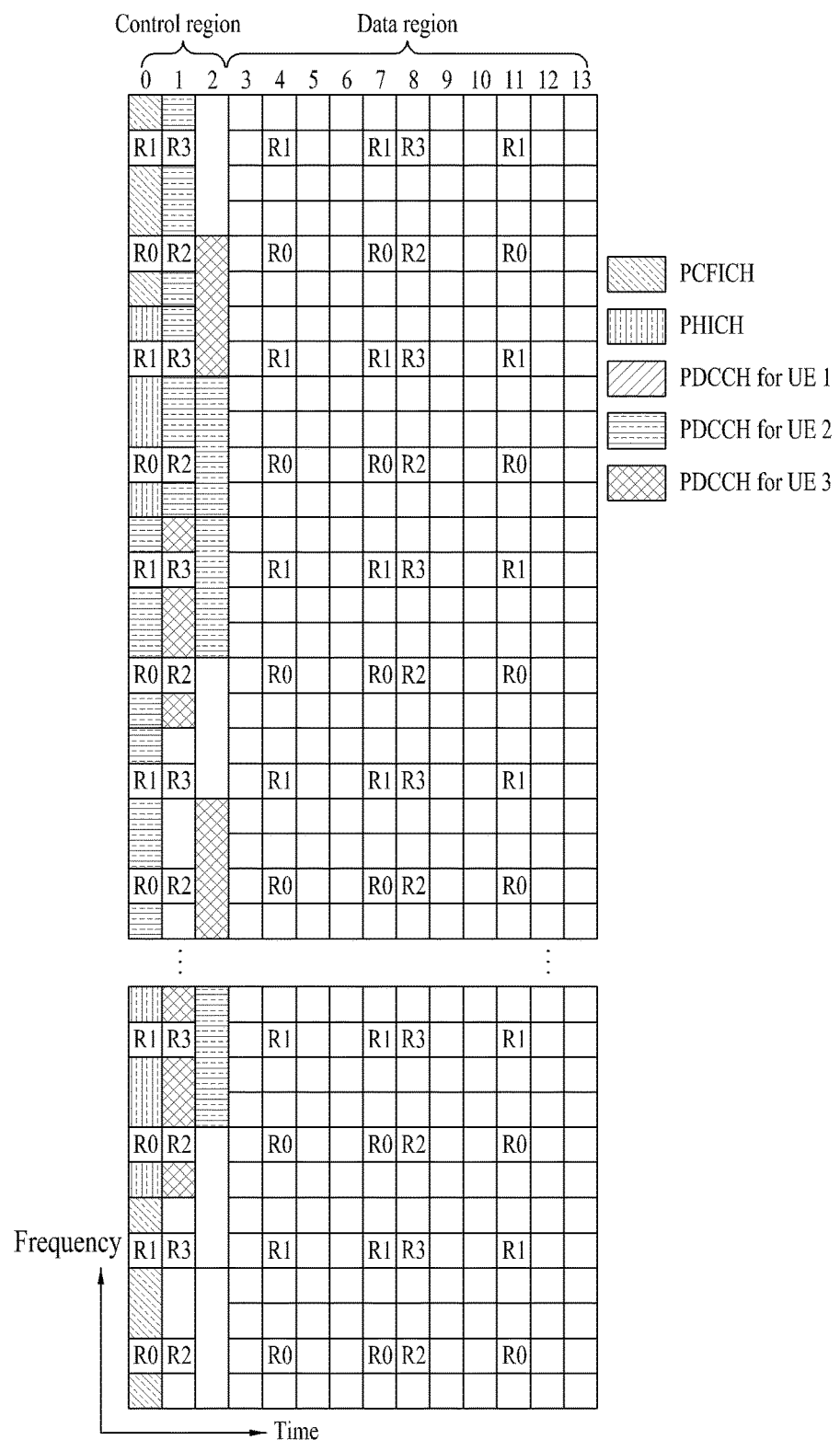
FIG. 5 is a diagram showing the structure of a downlink radio frame used in an LTE system.

FIG. 5 is a diagram showing a control channel included in a control region of one subframe in a downlink radio frame. Although the number of OFDM symbols included in one subframe may be changed according to a cyclic prefix (CP) (that is, a normal CP or an extended CP) length or a subcarrier spacing, the normal CP length or the subcarrier spacing are 15 kHz in the following description.

Referring to FIG. 5, a subframe includes 14 OFDM symbols. The first to third OFDM symbols are used as a control region and the remaining 13 to 11 OFDM symbols are used as a data region, according to subframe configuration.

In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

FIG. 6 is a diagram showing a resource unit used to configure a downlink control channel in an LTE system. In particular, FIG. 6(*a*) shows the case in which the number of transmit antennas of a base station is 1 or 2 and FIG. 6(*b*) shows the case in which the number of transmit antennas of a base station is 4. Only a reference signal (RS) pattern is changed but a method for setting a resource unit related to a control channel is not changed, according to the number of transmit antennas.

Referring to FIG. 6, a basic resource unit of a downlink control channel is a resource element group (REG). The REG includes four neighboring REs except for an RS. The REG is indicated by a thick line in the figure. A PCFICH and a PHICH includes four REGs and three REGs, respectively. A PDCCH is configured in control channel elements (CCEs) and one CCE includes nine REGs.

A UE is set to confirm $M^{(L)}(\geq L)$ CCEs which are arranged consecutively or in a specific rule, in order to determine whether a PDCCH including L CCEs is transmitted to the UE. The UE may consider a plurality of L values, for PDCCH reception. A set of CCEs which should be confirmed by the UE for PDCCH reception is referred to as a search space. For example, an LTE system defines the search space as shown in Table 1.

TABLE 1

| Type | Search space $S_k^{(L)}$ Aggregation level L | Size [in CCEs] | Number of PDCCH candidates $M^{(L)}$ | DCI formats |
|---|---|---|---|---|
| UE-specific | 1 | 6 | 6 | 0, 1, 1A, 2B, 1D, 2, 2A, 2B, 4 |
|  | 2 | 12 | 6 |  |
|  | 4 | 8 | 2 |  |
|  | 8 | 16 | 2 |  |

TABLE 1-continued

| Type | Search space $S_k^{(L)}$ Aggregation level L | Size [in CCEs] | Number of PDCCH candidates $M^{(L)}$ | DCI formats |
|---|---|---|---|---|
| Common | 4 | 16 | 4 | 0, 1A, 1C, 3/3A |
|  | 8 | 16 | 2 |  |

A CCE aggregation level L denotes the number of CCEs configuring a PDCCH, $S_k^{(L)}$ denotes a search space of the CCE aggregation level L, and $M^{(L)}$ denotes the number of candidate PDCCHs which should be monitored in the search space of the aggregation level L.

The search space may be divided into a UE-specific search space in which only access of a specific UE is allowed and a common search space in which access of all UEs in a cell is allowed. A UE monitors common search spaces having CCE aggregation levels of 4 and 8 and monitors UE-specific search spaces having CCE aggregation levels of 1, 2, 4 and 8. The common search space and the UE-specific search space may overlap.

In a PDCCH search space applied to an arbitrary UE with respect to each CCE aggregation level value, the location of a first CCE (having a smallest index) is changed according to subframe. This is referred to as PDCCH search space hashing.

The CCE may be distributed in a system band. More specifically, a plurality of logically contiguous CCEs may be input to an interleaver and the interleaver serves to interleave the input CCEs in REG units. Accordingly, frequency/time resources configuring one CCE are physically scattered and distributed in the whole frequency/time region within a control region of a subframe. As a result, the control channel is configured in CCE units but interleaving is performed in REG units, thereby maximizing frequency diversity and interference randomization gain.

FIG. 7 is a diagram showing the structure of an uplink subframe used in an LTE system.

Referring to FIG. 7, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 7 shows the case in which a PUCCH having m=0, a PUCCH having m=1, a PUCCH having m=2, and a PUCCH having m=3 are allocated to the subframe.

In a current wireless communication environment, with emergence and dissemination of various devices requiring machine-to-machine (M2M) communication and high data transfer rate, data requirements of a cellular network are growing very quickly. To satisfy high data requirements, carrier aggregation technology for efficiently using a larger frequency band, multi antenna technology for increasing data capacity within a restricted frequency, multi base-station coordinated technology, etc. have been developed as communication technology and a communication environment is evolved to increase the density of nodes which can be accessed by users. Coordination between nodes may improve system performance of a system with such a high density of nodes. In such a system, each node operates as an independent base station (BS), an advanced BS (ABS), a node B (NB), an eNodeB (eNB), an access point (AP), etc. and is far superior performance to a non-coordinated system.

Figure 8:
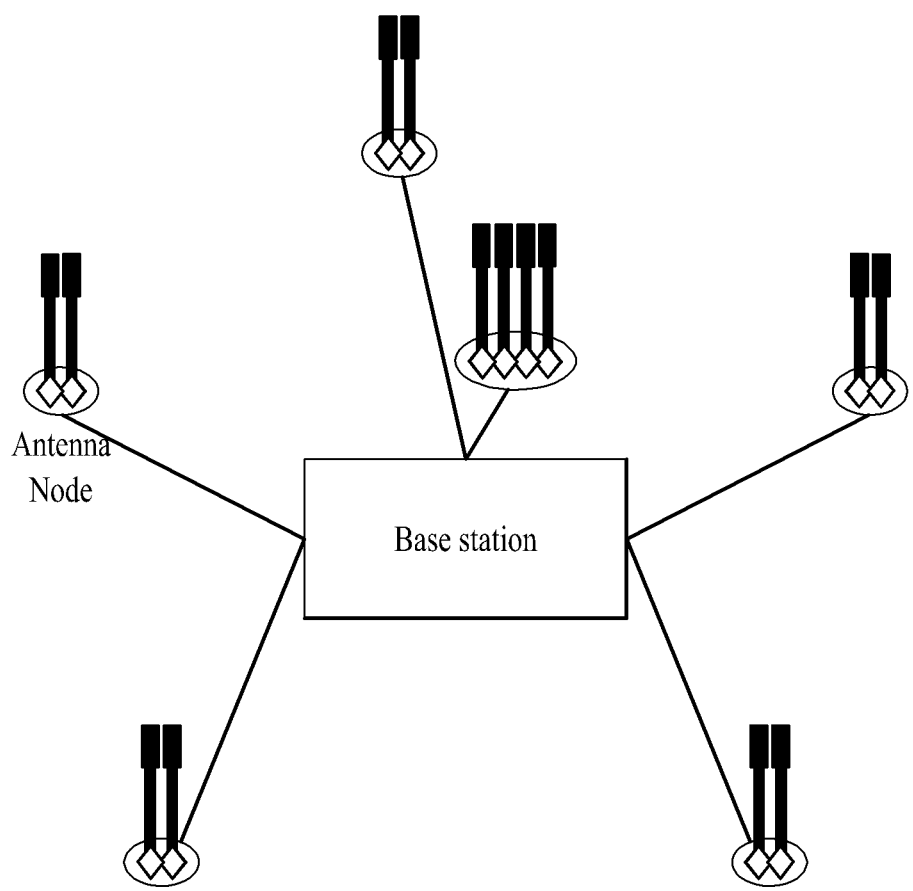
FIG. 8 is a diagram showing a multi-node system in a next-generation communication system.

FIG. 8 is a diagram showing a multi-node system in a next-generation communication system.

Referring to FIG. 8, if transmission and reception of all nodes are managed by one controller such that the individual nodes operate as parts of an antenna group of one cell, this system may be regarded as a distributed multi node system (DMNS) forming one cell. At this time, the individual nodes may be assigned separate node IDs or may operate as some antennas of a cell without a separate node ID. However, a system including nodes having different cell identifiers (IDs) may be a multi cell system. If multiple cells are configured to overlap according to coverage, this is called a multi-tier network.

Figure 9:
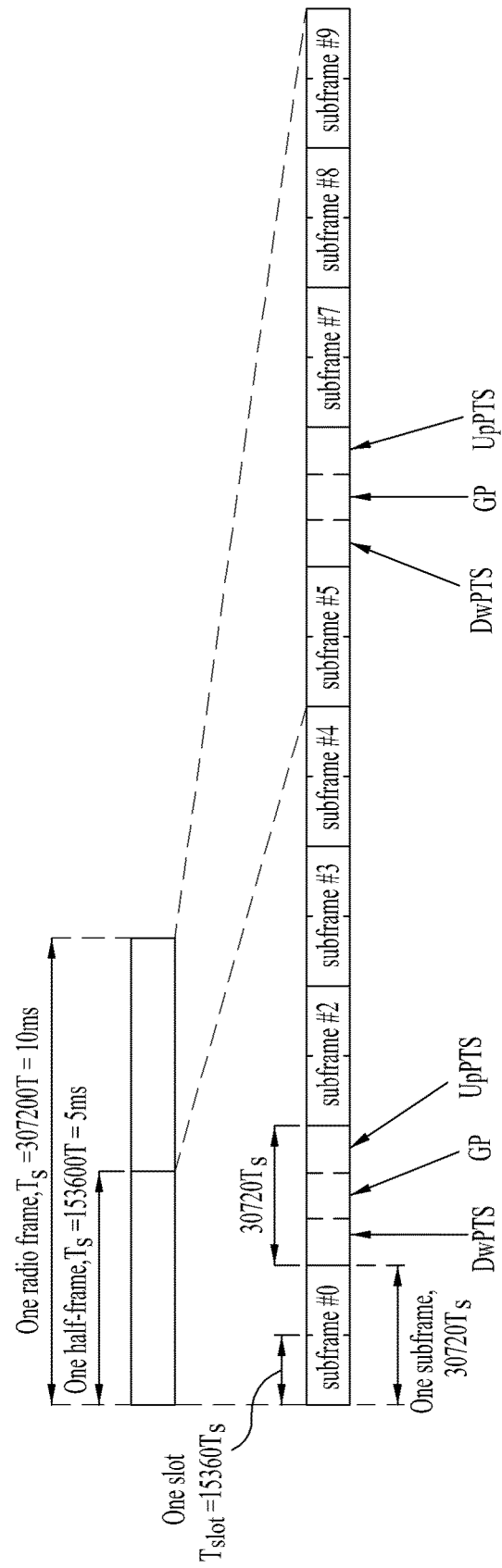
FIG. 9 is a diagram showing an E-PDCCH and a PDSCH scheduled by the E-PDCCH.

FIG. 9 is a diagram showing the structure of a radio frame in an LTE TDD system. In an LTE TDD system, the radio frame includes two half frames, each of which includes four normal subframes including two slots and a special subframe including a downlink pilot time slot (DwPTS), a guard period (GP), and an uplink pilot time slot (UpPTS).

In the special subframe, the DwPTS is used for initial cell search, synchronization and channel estimation at a user equipment. The UpPTS is used for channel estimation of a base station and uplink transmission synchronization of the user equipment. That is, the DwPTS is used for downlink transmission and the UpPTS is used for uplink transmission. In particular, the UpPTS is used for PRACH preamble or SRS transmission. The guard period is used to remove interference occurring in uplink due to multi-path delay of a downlink signal between uplink and downlink.

The special subframe is currently defined as shown in Table 2 below in the 3GPP standard. Table 2 shows the DwPTS and the UpPTS in case of $T_s=1/(15000\times2048)$. The remaining region is configured as a guard period.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

A NodeB, an eNodeB, a PeNB, a HeNB, a remote radio head (RRH), a relay, a distributed antenna, etc. may become a node and at least one antenna is mounted per node. The node is also called a transmission point. Although the node generally refers to a group of antennas separated at a predetermined interval or more, the present invention is applicable to an arbitrary group of nodes defined regardless of an interval.

Due to introduction of the above-described multi node system and relay node, various communication schemes are applicable to improve channel quality. However, in order to apply the MIMO scheme and an inter-cell communication scheme to a multi node environment, a new control channel is required. Accordingly, an enhanced-physical downlink control channel (E-PDCCH) is being discussed as a newly introduced control channel and is allocated to a data region (hereinafter, referred to as a PDSCH region), not to an existing control region, (hereinafter, referred to as a PDCCH region). In conclusion, control information of a node can be transmitted to each UE via such an E-PDCCH so as to solve a problem that an existing PDCCH region is insufficient. For reference, the E-PDCCH may not be transmitted to a legacy UE but may only be transmitted to an LTE-A UE. In addition, the E-PDCCH is transmitted and received not based on a cell-specific reference signal (CRS) but based on a demodulation reference signal (DM-RS) which is a UE-specific reference signal.

Figure 10:
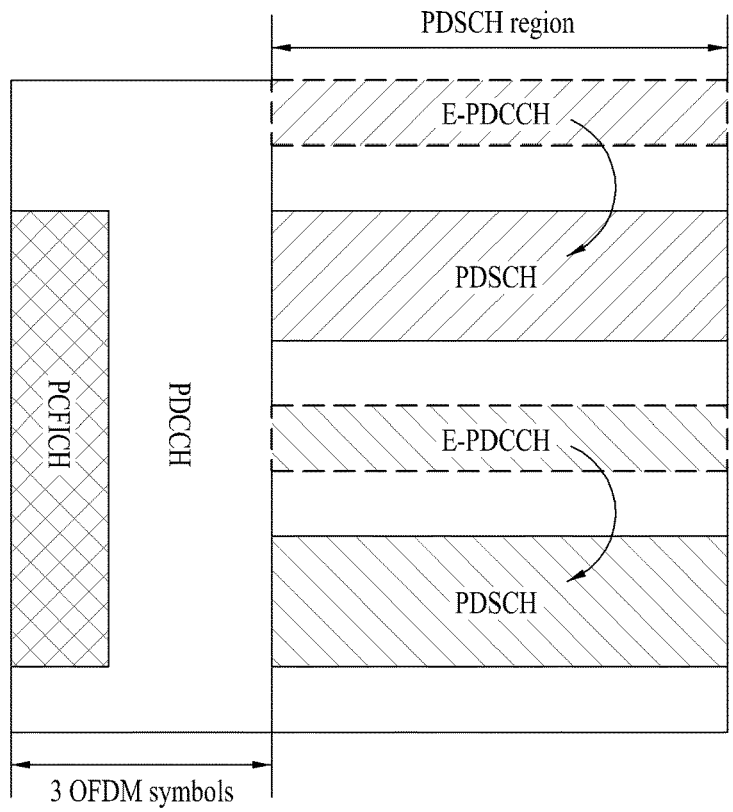
FIG. 10 is a diagram showing an example of a PDCCH region and an E-PDCCH region in one subframe.

FIG. 10 is a diagram showing an E-PDCCH and a PDSCH scheduled by the E-PDCCH.

Referring to FIG. 10, the E-PDCCH may be generally transmitted via a PDSCH region for transmitting data. A UE should perform a blind decoding process of a search space for the E-PDCCH in order to detect presence/absence of the E-PDCCH thereof.

The E-PDCCH performs the same scheduling operation (that is, PDSCH or PUSCH control) as the existing PDCCH. However, if the number of UEs accessing a node such as an RRH is increased, a larger number of E-PDCCHs is allocated to a PDSCH region, thereby increasing the number of times of blind decoding to be performed by the UE and increasing complexity.

Hereinafter, a reference signal will be described in greater detail.

In general, for channel measurement, a reference signal (RS) known to a transmitter and a receiver is transmitted from the transmitter to the receiver along with data. Such a reference signal serves to indicate channel measurement and modulation scheme to enable a demodulation process. The reference signal is divided into a dedicated RS (DRS) for a base station and a specific UE, that is, a UE-specific reference signal, and a common RS (CRS) which is a cell-specific reference signal for all UEs of a cell. In addition, the cell-specific reference signal includes a reference signal for enabling a UE to measure and report CQI/PMI/RI to a base station and is referred to as a channel state information-RS (CSI-RS).

Figure 11:
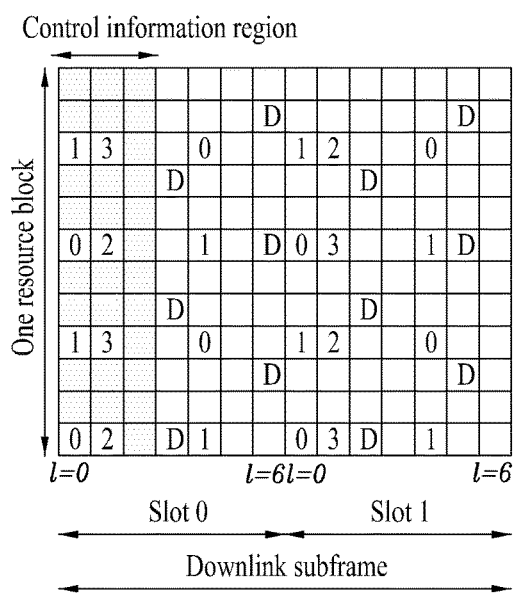
FIGS. 11 and 12 are diagrams showing the structure of a reference signal in an LTE system supporting downlink transmission using four antennas.
Figure 12:
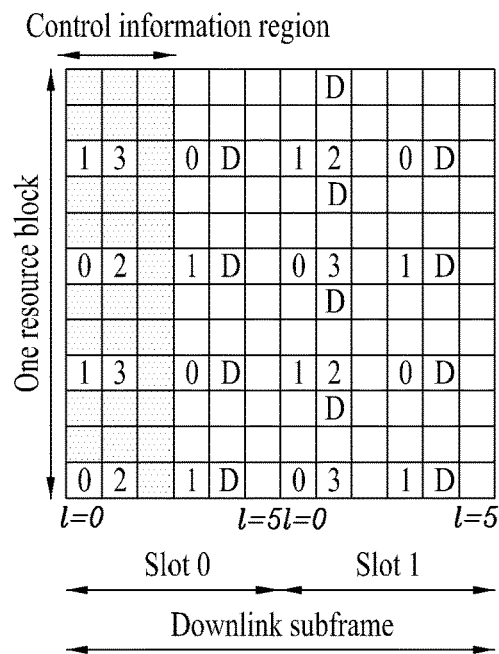

FIGS. 11 and 12 are diagrams showing the structure of a reference signal in an LTE system supporting downlink transmission using four antennas. In particular, FIG. 11 shows a normal cyclic prefix (CP) and FIG. 12 shows an extended CP.

Referring to FIGS. 11 and 12, 0 to 3 denoted in grids mean CRSs which are cell-specific RSs transmitted for channel measurement and data demodulation in correspondence with antenna ports 0 to 3 and the CRS which is the cell-specific RS may be transmitted to the UE not only via a data information region but also via a control information region.

In addition, "D" denoted in a grid means a downlink demodulation-RS (DM-RS) which is a UE-specific RS and the DM-RS supports single antenna port transmission via a data region, that is, a PDSCH. The UE receives information on presence/absence of the DM-RS, which is the UE-specific RS, via a higher layer. FIGS. 11 and 12 show a DM-RS corresponding to antenna port 5. In the 3GPP standard 36.211, DM-RSs of antenna ports 7 to 14, that is, a total of eight antenna ports, are also defined.

Figure 13:
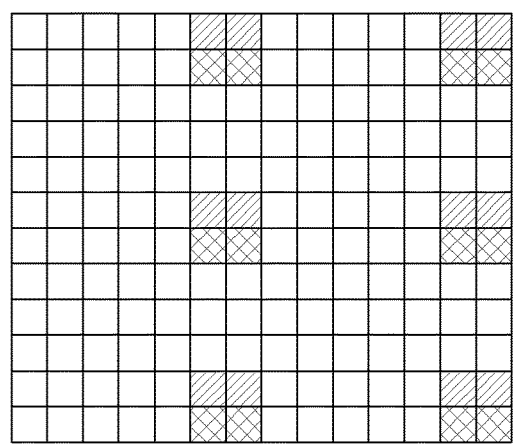
FIG. 13 is a diagram showing an example of allocating a DM-RS currently defined in the 3GPP standard.

FIG. 13 is a diagram showing an example of allocating a DM-RS currently defined in the 3GPP standard.

Referring to FIG. 13, DM-RSs corresponding to antenna ports {7, 8, 11, 13} are mapped to DM-RS group 1 using a per-antenna-port sequence via a code division multiplexing scheme and DM-RSs corresponding to antenna ports {9, 10, 12, 14} are mapped to DM-RS group 2 using a per-antenna-port sequence via a code division multiplexing scheme.

The present invention proposes a method for determining an antenna port of a DM-RS for an E-PDCCH. The operation principle of the below-described downlink control channel is equally applicable to a control channel such as an enhanced PHICH (E-PHICH) for sending ACK/NACK for uplink signal (PUSCH) transmission of a UE.

In general, since a large amount of resource elements are included for control channel signal transmission, a single PRB pair is preferably divided into one or more resource element subsets and an E-PDCCH is transmitted by appropriately utilizing the resource element subsets. Such a resource element subset may be referred to as an E-CCE, which is a transmission unit of an E-PDCCH, and one E-PDCCH may be transmitted by aggregating one or a plurality of E-CCEs according to aggregation level. An E-CCE used to transmit a single E-PDCCH may be extracted from a single PRB pair for frequency localized transmission or from different PRB pairs for frequency distributed transmission.

A base station adjusts the number of E-CCEs to be used for aggregation level according to the channel state of a UE. That is, when the channel state of the UE becomes worse, a larger number of E-CCEs are used to attempt more stable control channel transmission. In order to easily adjust the number of E-CCEs, the size of each E-CCE, that is, the number of REs occupied by each E-CCE is preferably maintained within a predetermined range.

Currently, in an LTE system, since the number of available resource elements in a downlink subframe is variously changed according to a reference signal configuration, a multimedia broadcast multicast service single frequency network (MBSFN) subframe, the number of symbols occupied by a PDCCH and the configuration of a DwPTS of a special subframe of TDD, maintaining the size of each E-CCE means that the number of E-CCEs generated in one PRB pair is changed according to the configuration of a subframe. Here, the MBSFN subframe is characterized in that a CRS is not transmitted in a data region, that is, a PDSCH region, unlike a normal subframe.

The present invention proposes a method for determining a DM-RS to be used when a UE demodulates an E-CCE in a state in which the number of E-CCEs generated in one PRB pair is changed according to subframe.

Figure 14:
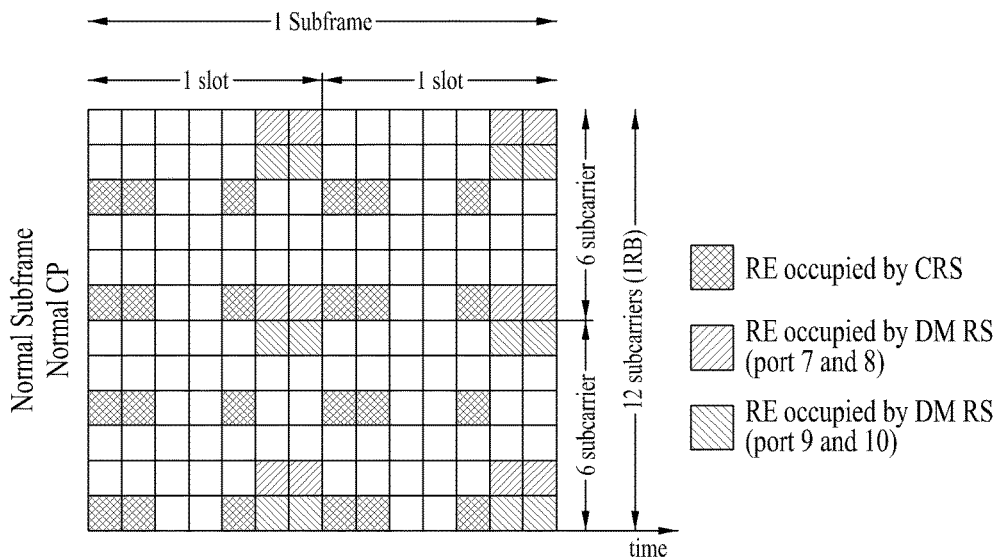
FIG. 14 is a diagram showing the location of a resource element, to which a DM-RS changed according to an antenna port for the DM-RS is mapped, in an LTE system.

FIG. 14 is a diagram showing the location of a resource element, to which a DM-RS changed according to an antenna port for the DM-RS is mapped, in an LTE system. In particular, FIG. 14 shows a subframe other than an MBSFN subframe, to which a normal CP is applied. The locations of DM-RSs shown in FIG. 14 may be changed according to subframe configuration.

Referring to FIG. 14, as the number of antenna ports is increased, RS overhead is increased (that is, the number of available resource elements is reduced due to DM-RSs). When only antenna port 7 and antenna port 8 are used, 12 resource elements are used for the DM-RS and thus the 12 resource elements are subtracted from the available resource elements. When antenna port 9 and antenna port 10 are further used, 12 resource elements are used for the DM-RS and thus the 12 resource elements are subtracted from the available resource elements.

In general, different E-CCEs in one PRB pair may be allocated to different UEs. Different E-CCEs are preferably demodulated using DM-RSs of different antenna ports because beamforming can be performed according to a channel corresponding to each UE.

In this state, if four E-CCEs are derived from each PRB pair in one subframe, the E-CCEs may be respectively demodulated using antenna ports 7 to 10 and, if two E-CCEs are derived from each PRB pair in another subframe, the two E-CCEs may be respectively demodulated using two antenna ports (e.g., antenna port 7 and antenna port 8) only. In other words, a set of available DM-RS antenna ports is changed according to configuration of each subframe.

Accordingly, in the present invention, a base station instructs a UE to use at least one of a large number of available antenna ports and to select one from among the available antenna ports according to a predetermined rule if the antenna port indicated in a specific subframe is not present in the available set.

For example, a UE, which is configured to use antenna port 9 or antenna port 10 in a subframe in which four E-CCEs are generated per PRB pair, operates to use antenna port 7 or antenna port 8 in a subframe in which two E-CCEs are generated per RPB pair. Here, in a subframe in which two E-CCEs are generated, since antenna port 9 and antenna port 10 are not present, the UE may assume that the E-PDCCH is transmitted in the resource elements on which the reference signals of antenna ports 9 and 10 will be transmitted, that is, that resource elements on which the reference signals of antenna ports 9 and 10 will be transmitted are available resource elements.

A UE configured to use an antenna port P uses an antenna port index given as a function $f(P, K)$ in a subframe in which K E-CCEs are generated per PRB pair. Here, $f(P, K)$ has one of 7, 8, ..., and $7+K-1$ and may be expressed by one of various forms shown in Equations 8 to 12 below. Note that Equations 8 to 12 below show determination of antenna port indices of DM-RSs for E-PDCCHs, which are different from a method for mapping to E-CCEs.

$$f(P, K) = 7 + (P \bmod K) \qquad \text{Equation 8}$$

$$f(P, K) = 7 + ((P-1) \bmod K) \qquad \text{Equation 9}$$

$$f(P, K) = 7 + ((P-7) \bmod K) \qquad \text{Equation 10}$$

$$f(P, K) = 7 + A \times \left\lfloor \frac{P-7}{A} \right\rfloor \left( \text{where, } A = \frac{4}{K} \right) \qquad \text{Equation 11}$$

$$f(P, K) = 7 + A \times \left\lfloor \frac{P-7}{A} \right\rfloor + B \qquad \text{Equation 12}$$

(where, $$A = \frac{4}{K},$$

B is an offset applied to PRB pair)

More specifically, in Equation 10, a UE which uses antenna port 7 to antenna port 10 when K=4 uses antenna port 7 and antenna port 8 when K=2. Since antenna port 9 and antenna port 10 are not used, it is possible to reduce RS overhead.

In addition, in Equation 11, a UE which uses antenna port to antenna port 10 when K=4 may use antenna port 7 and antenna port 8 when K=2. Accordingly, since antenna ports for reference signals, which are subjected to code division multiplexing (CDM) and are transmitted, are not used, transmit power of a reference signal can be easily amplified.

Further, in FIG. 12, since only one antenna port is used in a resource element in which reference signals are subjected to CDM and another antenna port is configured in a PRB pair having another B value, the antenna port may be differently configured per PRB pair. For example, antenna port 7 and antenna port 9 are used if B=0 and K=2 and antenna port 8 and antenna port 10 may be used if B=1 and K=2. The B value may be set to 0 if the index of the PRB pair is an even number and may be set to 1 if the index of the PRB pair is an odd number. This method may be advantageous in that the antenna port used by the E-PDCCH is differently configured per PRB pair such that interference with a PDSCH used by a neighboring cell or transmission point (TP) is not concentrated on a specific antenna port but is distributed.

In Equations 8 to 12, K may be the number of E-CCEs generated in one PRB pair or may be a parameter determined thereby. For example, if antenna ports 7 to 9 are used when three E-CCEs are generated in one PRB pair, the above-described operation may be performed. However, if antenna port 7 and antenna port 8 operate to use the three E-CCEs in order to prevent RS overhead from being increased, K should be set to 2.

As another method, the antenna port configured to be used by the UE may not be changed but RS overhead may be changed according to subframe. For example, the UE configured to use antenna port 9 or antenna port 10 continues to detect an E-PDCCH using antenna port 9 and antenna port 10 even in subframes in which two E-CCEs are defined in one PRB pair and assumes that resource elements for antenna port 7 and antenna port 8 are also used to transmit an E-PDCCH, that is, are not available resource elements. In this case, the base station transmits only the E-PDCCH of the UE, which uses antenna port 7 or antenna port 8, in one PRB pair or transmits only the E-PDCCH of the UE, which uses antenna port 9 or antenna port 10, in one PRB pair via appropriate scheduling to prevent collision between the resource element to which the E-PDCCH is allocated and the resource element to which the DM-RS is allocated.

In implementation of the above-described operation, the UE may use different antenna ports in different E-CCEs. For example, when E-CCE #a and E-CCE #b are present in the same PRB pair, the UE may attempt to detect E-CCE #a via antenna port P_a and attempt to detect E-CCE #b via antenna port P_b. In such an operation, different antenna ports are used in different E-CCEs when E-PDCCHs of different UEs are transmitted within the same PRB pair, thereby simultaneously avoiding collision between E-CCEs and antenna ports used by two UEs.

Even in this case, the antenna port used when the UE detects each E-CCE according to the above-described method may be changed according to the number of E-CCEs generated in one PRB pair (or a parameter determined thereby). That is, if a specific E-CCE is configured to be detected using antenna port P and K E-CCEs are derived from the PRB pair in a specific subframe, antenna port denoted by f(P, K) may be used and the function f(P, K) may be one selected from Equations 8 to 12.

For example, if one PRB pair is divided into four E-CCEs such as E-CCE #0, E-CCE #1, E-CCE #2 and E-CCE #3 (that is, K=4), antenna ports #7, #8, #9 and #10 are configured to be used to detect the D-CCEs, and, if one PRB pair is divided into two E-CCEs (that is, K=2), E-CCE #0 and E-CCE #1 formed in one PRB pair are detected using antenna port #7 and antenna port #8 and E-CCE #2 and E-CCE #3 are generated in another PRB pair and are detected using antenna port #7 and antenna port #8 using Equation 10.

As another example, if one PRB pair is divided into four E-CCEs such as E-CCE #0, E-CCE #1, E-CCE #2 and E-CCE #3 (that is, K=4), the D-CCEs are detected using antenna ports #7, #8, #9 and #10, and, if one PRB pair is divided into two E-CCEs (that is, K=2), E-CCE #0 and E-CCE #1 formed in one PRB pair are detected using DM-RSs which are not mapped to the same resource elements, that is, the DM-RSs for antenna port #7 and antenna port #9, which are not subjected to CDM, and E-CCE #2 and E-CCE #3 are generated in another PRB pair and are detected using antenna port #8 and antenna port #10 using Equation 12.

Figure 15:
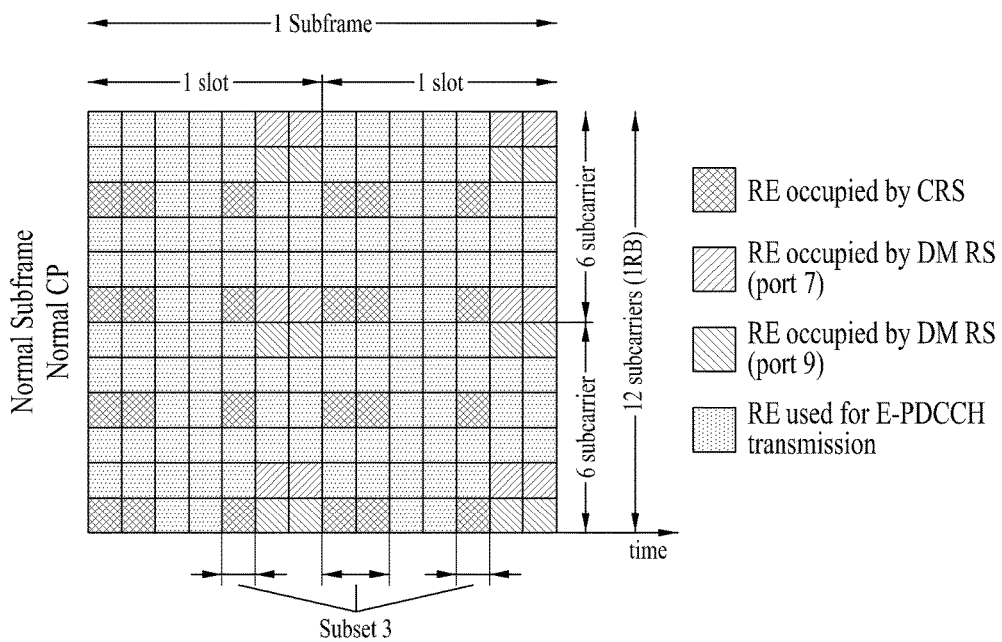
FIG. 15 is a diagram showing an example of transmitting an E-PDCCH according to an embodiment of the present invention.

FIG. 15 is a diagram showing an example of transmitting an E-PDCCH according to an embodiment of the present invention. In particular, assume that one PRB pair is divided into two E-CCEs.

If one PRB pair is divided into four E-CCEs, the E-CCEs are detected using antenna port #7, antenna port #8, antenna port #9 and antenna port #10 and, if one PRB pair is divided into two E-CCEs, as shown in FIG. 15, E-CCE #0 and E-CCE #1 formed in one PRB pair are detected using DM-RSs which are not mapped to the same resource element, that is, the DM-RSs of antenna ports #7 and #9 which are not subjected to CDM.

Figure 16:
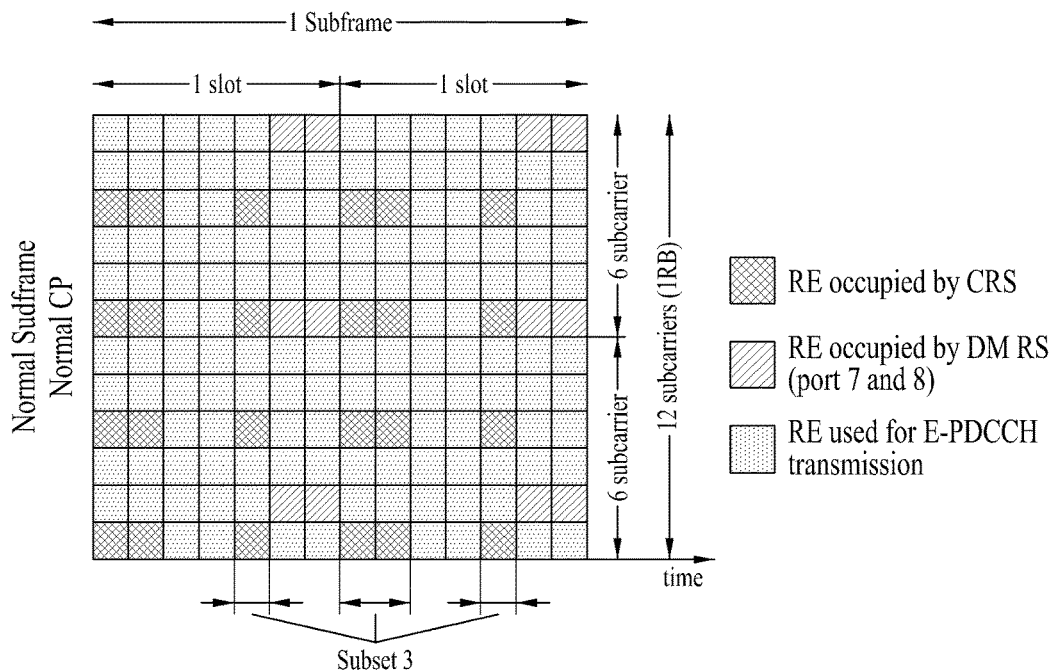
FIG. 16 is a diagram showing another example of transmitting an E-PDCCH according to an embodiment of the present invention.

FIG. 16 is a diagram showing another example of transmitting an E-PDCCH according to an embodiment of the present invention. In particular, in FIG. 16, assume that one PRB pair is divided into two E-CCEs.

If it is assumed that the E-PDCCH is detected using antenna port 7 and antenna port 8 shown in FIG. 16 and the resource elements of antenna port 9 and antenna port 10 are available resource elements for E-PDCCH transmission, it is possible to avoid collision of the E-PDCCH or PDSCH, which may be transmitted from a neighboring cell, with a reference signal.

In FIGS. 15 and 16, the resource elements denoted by E-PDCCH transmission are only exemplary and may be changed according to the length of a region occupied by the PDCCH, presence/absence of the CRS and CSI-RS, etc. One E-PDCCH may be transmitted using some of the resource elements which may be used by the E-PDCCH only.

As a method for adjusting the number of REs used by the E-PDCCH according to subframe configuration, instead of adjustment of the number of E-CCEs formed in a single PRB pair, a method of forming the same number of E-CCEs in a single PRB pair and increasing a minimum aggregation level in a search space of a UE may be considered. The minimum aggregation level means an aggregation level of an E-PDCCH candidate using a smallest number of E-CCEs among E-PDCCH candidates defined in a search space of a UE. For example, in a subframe in which a relatively large number of resource elements is available for the E-PDCCH, one E-CCE is regarded as a minimum aggregation level and a search space is configured in the form of aggregation level 1, 2 and 4 or 8. In contrast, in a subframe in which a relatively small number of resource elements is available for the E-PDCCH, two E-CCEs are regarded as a minimum aggregation level and a search space is configured in the form of aggregation level 2, 4, 8 or 16. In other words, if the number of resource elements available for the E-PDCCH is small, several E-CCEs are regarded as one special E-CCE and a search space is configured by a combination thereof.

Even in this case, the above-described operation of the present invention is applicable and the parameter K may be "the number of E-PDCCH candidates of a minimum aggregation level derived from one PRB pair" or "the number of special E-CCEs derived from one PRB pair". That is, when four E-CCEs are always defined in one PRB pair, K=4 if the minimum aggregation level is 1 in the corresponding subframe and K=2 if the minimum aggregation level is 2 in the corresponding subframe because a total of two E-PDCCH candidates of the minimum aggregation level may be derived.

The reference signal, transmit power of which is boosted for better power estimation and the reference signal, transmit power of which is boosted, increases interference with a neighboring cell. At this time, if the neighboring cell also applies transmit power boosting to the same resources, mutual interference is only increased and thus the effects of transmit power boosting cannot be obtained. In this case, if the E-PDCCH is transmitted using antenna port 7 or antenna port 8 in one cell and, at the same time, antenna port 9 or antenna port 10 is used in a neighboring cell, since the reference signal is transmitted in a mutually orthogonal resource region, it is possible to avoid collision between reference signals and to obtain the effects of transmit power boosting of the reference signal.

In particular, such a method is suitable for a shared reference signal used when a plurality of UEs detects an E-PDCCH based on a reference signal of the same antenna port, because the shared reference signal should be transmitted with power capable of reaching several UEs and thus transmit power thereof is mostly boosted.

Since such shared reference signal should be subjected to precoding effective for many UEs, a transmit diversity scheme is applicable. There are a method for transmitting a linear combination of several modulation symbols, such as space-frequency block coding (SFBC), at each antenna port and a precoder cycling method for applying different precoding matrices in different resource elements according to a predefined rule. As a detailed example of such precoder cycling, a precoding vector in which one component is 1 and the remaining components are 0 is used as a precoding matrix, such that modulation is performed using a specific antenna port of a reference signal in one resource element and modulation is performed using another antenna port in another resource element. Since transmit diversity is applied using two or more antenna ports in both of the above-described methods, two or more antenna ports are used for reference signal transmission and thus a set of antenna ports is configured.

According to the present invention, for better inter-cell reference signal collision avoidance operation, an eNB may configure an antenna port (or a set of antenna ports) to be used for E-PDCCH detection via a higher layer signal such as an RRC signal with respect to a UE. Such a configuration may be restricted when the above-described shared reference signal or transmit diversity is applied. For example, if transmit diversity using two antenna ports is applied, a total of six combinations, such as {7, 8}, {7, 9}, {7, 10}, {8, 9}, {8, 10} and {9, 10}, may be assumed and an appropriate set may be selected therefrom.

Alternatively, in order to reduce the number of combinations to be implemented by the UE, possible combinations may be further restricted. First, one of antenna port combinations {7, 9} and {8, 10} may be selected if RS overhead is defined by 24 resource elements and one of antenna port combinations {7, 9} and {9, 10} may be selected if RS overhead is defined by 12 resource elements. For mutual orthogonality between the antenna ports {7, 9} and {8, 10}, since the same scrambling sequence is used, two cells may mutually exchange scrambling sequence information to be used in each E-PDCCH region.

Further, when a set of reference signal antenna ports to be applied to transmit diversity based on the above-described shared reference signal may be specified, the index of the reference signal antenna port may be differently determined according to PRB as in Equation 12. For example, when RS overhead is defined by 24 resource elements and one of {7, 9} and {8, 10} is selected as the index of the reference signal antenna port applied to transmit diversity, an offset B may be applied to each PRB pair, {7, 9} may be selected if B is 0 and {8, 10} may be selected if B is 1. Here, the value B may be variously set. For example, the value B may be set to 0 if the PRB pair index is an even number and may be set to 1 if the PRB pair index is an odd number.

Alternatively, a series of PRB pairs is selected to configure one PRB pair set, B=0 is set in the PRB pair set (that is, PRB pair set #0) and an E-PDCCH is detected using {7, 9}. At the same time, another series of PRB pairs is selected to configure another PRB pair set (that is, PRB pair set #1), B=1 is set and an E-PDCCH is detected using {8, 10}. If two or more PRB pair sets are present, the offset B for determining the reference signal antenna port used in PRB pair set #n may be a function having an index n of the PRB pair set as a factor.

For example, B=n or B=n mod 2 may be defined. In particular, in case of B=n mod 2, B=0 if the PRB pair index is an even number and B=1 if the PRB pair index is an odd number. As another example, the offset B to be used in each PRB pair (or the above-described PRB pair set) may be specified by a higher layer signal such as RRC.

Figure 17:
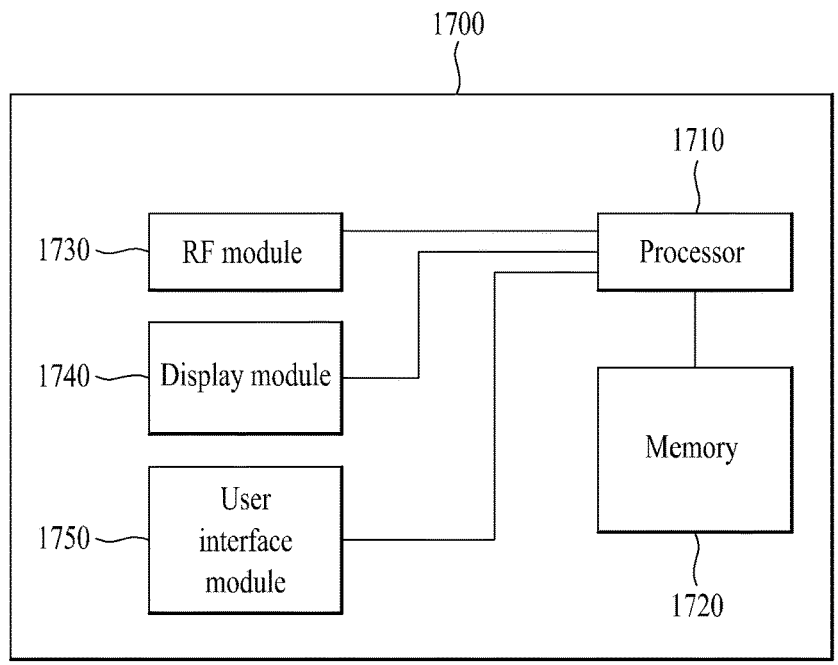
FIG. 17 is a block diagram of a communication apparatus according to one embodiment of the present invention.

FIG. 17 is a block diagram of a communication apparatus according to one embodiment of the present invention.

Referring to FIG. 17, a communication apparatus 1700 includes a processor 1710, a memory 1720, a Radio Frequency (RF) module 1730, a display module 1740 and a user interface module 1750.

The communication apparatus 1700 is shown for convenience of description and some modules thereof may be omitted. In addition, the communication apparatus 1700 may further include necessary modules. In addition, some modules of the communication apparatus 1700 may be subdivided. The processor 1710 is configured to perform an operation of the embodiment of the present invention described with reference to the drawings. For a detailed description of the operation of the processor 1710, reference may be made to the description associated with FIGS. 1 to 16.

The memory 1720 is connected to the processor 1710 so as to store an operating system, an application, program code, data and the like. The RF module 1730 is connected to the processor 1710 so as to perform a function for converting a baseband signal into a radio signal or converting a radio signal into a baseband signal. The RF module 1730 performs analog conversion, amplification, filtering and frequency up-conversion or inverse processes thereof. The display module 1740 is connected to the processor 1710 so as to display a variety of information. As the display module 1740, although not limited thereto, a well-known device such as a Liquid Crystal Display (LCD), a Light Emitting Diode (LED), or an Organic Light Emitting Diode (OLED) may be used. The user interface module 1750 is connected to the processor 1710 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method and device for determining a reference signal antenna port for a downlink control channel in a wireless communication system is applied to a 3GPP LTE system is described, the present invention is applicable to various wireless communication systems in addition to the 3GPP LTE system.

The invention claimed is:

1. A method for transmitting a downlink control channel to a user equipment (UE) at a base station in a wireless communication system, the method comprising:
   configuring two or more control channel elements for transmitting the downlink control channel;
   allocating a single antenna port for a demodulation reference signal (DM-RS) to the two or more control channel elements; and
   transmitting the downlink control channel to the UE using the two or more control channel elements to which the single antenna port for the DM-RS is allocated,
   wherein an index of the single antenna port is determined by using a number of control channel elements per resource block.

2. The method of claim 1, wherein the number of control channel elements per resource block is changed according to a configuration of a subframe on which the downlink control channel is transmitted.

3. The method of claim 1, wherein the number of control channel elements per resource block is 2 or 4.

4. The method of claim 1, wherein, if the number of control channel elements per resource block is 2, the index of the single antenna port is one of 7 or 9.

5. The method of claim 1, wherein, if the number of control channel elements per resource block is 4, the index of the single antenna port is one of 7 to 10.

6. The method of claim 5,
   wherein the DM-RS having the antenna port index 7 and the DM-RS having the antenna port index 8 are multiplexed to a first set of common resource elements, and
   wherein the DM-RS having the antenna port index 9 and the DM-RS having the antenna port index 10 are multiplexed to a second set of common resource elements.

7. A method for receiving a downlink control channel from a base station at a user equipment (UE) in a wireless communication system, the method comprising:
   receiving, from the base station, the downlink control channel using two or more control channel elements to which a single antenna port for the DM-RS is allocated; and
   demodulating the downlink control channel using a demodulation reference signal (DM-RS) of the single antenna port allocated to the two or more control channel elements,
   wherein an index of the single antenna port is determined by using a number of control channel elements per resource block.

8. The method of claim 7, wherein, if the number of control channel elements per resource block is 2, the index of the single antenna port is one of 7 or 9.

9. A user equipment (UE) configured to receive a downlink control channel from a base station in a wireless communication system, the UE comprising:
- a receiver configured to receive, from the base station, the downlink control channel using two or more control channel elements to which a single antenna port for the DM-RS is allocated; and
- a demodulator configured to demodulate the downlink control channel using a demodulation reference signal (DM-RS) of the single antenna port allocated to the two or more control channel elements,
wherein an index of the single antenna port is determined by using a number of control channel elements per resource block.

* * * * *